United States Patent [19]

Woodcock et al.

[11] 3,831,131

[45] Aug. 20, 1974

[54] INTEGRATED CIRCUIT PACKAGE CONNECTORS

[75] Inventors: Brain R. Woodcock, Chadds Ford; John L. Tansky, Collingdale, both of Pa.

[73] Assignee: Bunker Ramo Corporation, Oak Brook, Ill.

[22] Filed: Nov. 8, 1971

[21] Appl. No.: 196,676

[52] U.S. Cl. ....... 339/95 R, 339/17 CF, 339/112 R, 339/174, 339/252 R

[51] Int. Cl. ........ H05k 1/12, H01r 13/50

[58] Field of Search ........ 174/DIG. 3, 68.5; 317/101 A, 101 C, 101 CC, 101 D; 339/17, 48, 49, 112, 95 R, 174, 176 M, 176 MP, 252 R, 64

[56] References Cited

UNITED STATES PATENTS

| | | | |
|---|---|---|---|
| 3,700,788 | 10/1972 | Spurck | 339/176 M X |
| 3,701,071 | 10/1972 | Landeman | 339/176 MP X |
| 3,274,534 | 9/1966 | Shortridge | 339/95 R |
| 3,393,396 | 7/1968 | Majewski | 339/92 M |
| 3,409,861 | 11/1968 | Barnes et al. | 339/174 |
| 3,008,113 | 11/1961 | Johnson | 339/176 MP |
| 3,409,857 | 11/1968 | O'Neill et al. | 339/17 CF |
| 2,965,811 | 12/1960 | Batcher | 339/17 M |

FOREIGN PATENTS OR APPLICATIONS

| | | | |
|---|---|---|---|
| 739,103 | 7/1966 | Canada | 339/17 CF |
| 1,228,816 | 3/1960 | France | 339/176 MP |
| 1,492,219 | 7/1967 | France | 174/DIG. 3 |
| 886,419 | 1/1962 | Great Britain | 339/48 |

OTHER PUBLICATIONS

Boehm et al., Burndy Data Sheet HSSB, 8-1963.

*Primary Examiner*—Stephen J. Novosad
*Assistant Examiner*—Lawrence J. Staab
*Attorney, Agent, or Firm*—Frederick M. Arbuckle

[57] ABSTRACT

Electrical conductors in which a flat integrated circuit package is held on insulating base means to engage conductive pads of the package with forwardly projecting active end portions of contact means disposed in the base means. Initially, the active portions are moved rearwardly, through bending of a laterally extending portion of the contact means, and a high unit contact pressure is developed after which the active portions are moved laterally, through bending of an angularly extending portion of the contact means, with a wiping action under the high unit contact pressure. The contact means are disposed in two parallel groups for coaction with pads disposed along opposite sides of a rectangular package and are arranged in a manner such as to balance lateral forces developed from the wiping actions. The package is held on the base by holding plate or screws, engaging the package at points such as to equalize contact pressures and minimize stresses on the package.

20 Claims, 15 Drawing Figures

INTEGRATED CIRCUIT PACKAGE CONNECTORS

This invention relates to electrical connectors and more particularly to connectors in which an integrated circuit chip is permanently mounted in a compact, easily handled and durable package which is readily installed in, or removed from, a connector device of economical and compact construction and which is highly reliable even after a large number of repeated connect-disconnect operations.

Integrated circuits are generally supplied in packages having protruding relatively thin leads for connection of the circuits to external circuitry. One common type of package is the dual-in-line package in which the thin leads protrude from opposite sides of the package and then are bent at right angles in a common direction. By way of example, twenty leads may protrude from each side in a forth lead package. Such packages are difficult to manufacture, it being necessary to bend the leads and breaking of the leads being a major cause of trouble and causing rejection of many packages. Leads may also be broken during testing and shipping, even though installed in a protective carrier, and are also easily damaged in installation before use. Since the integrated circuits are expensive, such problems are of a serious nature.

Another more recent type of package utilizes conductive pads along one edge and is vertically insertable a short distance into a slot of an edge mount connector. In this combination forming an electrical module, the edge of the flat package rather than external leads provides some physical support for the package plus conductive elements for engagement with contacts in the connector. While these edge mount packages do not have the problems associated with external leads, they are usually very thin, quite brittle and can be damaged unless adequately supported.

Also since the edge mount package engages the contacts of the connector at a single edge, it is usually necessary to interconnect the centrally mounted circuit chip to individual conductive pads at that edge, resulting in problems in the design of a pattern of interconnecting conductors, a lengthy package with lengthy interconnecting conductors and the possibility of increased electrical interaction between interconnecting conductors.

This invention was evolved with the general object of solving the problems inherent in prior art constructions and of providing electrical connectors in which integrated circuit packages having conductive pads may be readily installed and removed and which provide reliable and trouble-free connections to the conductive pads.

A specific object of the invention is to provide electrical contacts engagable by conductive pads or the like and operable to provide low-resistance reliable connections even after a large number of connect-disconnect operations.

This invention involves the use of an integrated circuit package in which a chip is centrally mounted in a flat package which preferably is generally rectangular with conductive pads in two groups along opposite sides of the package, the pads being connected within the package to the chip and having rearwardly facing generally coplanar surfaces for external connections thereto. The package is mounted against the forwardly facing surface of insulating base means to engage the pads with projecting active portions of contact means mounted in bores of the insulating base means.

In accordance with a very important feature of the invention, the contact means include pressure-developing means operative in response to an initial portion of rearward movement of the pads to initially develop a high unit pressure engagement between the active portions and the pads and further includes lateral deflection control means operative in response to a subsequent portion of the rearward movement of the pads to effect a lateral movement of the acrive portions and a wiping action on the pads under the high unit pressure initially developed. With this arrangement, the electrical connections are excellent with very low resistance. Oxides or other high resistance materials on the interengaged surfaces are removed during the wiping action under high unit pressure.

In accordance with a specific feature of the invention, the pressure developing means includes resilient support means, preferably in the form of a laterally extending portion of spring metal, allowing rearward movement of the active portions through a substantial distance for gradual development of the high unit pressure.

According to another specific feature, the lateral deflection means comprises a portion of spring metal extending angularly at an acute angle relative to a line parallel to the rearward direction of travel of the pads, the angle being preferably substantially less than 45 degrees. This arrangement insures that the wiping action will be under the high unit pressure.

A further specific feature is in the provision of interengaging stop surface portions of the base and contact means for limiting lateral movement of the active portions in a direction opposite the wiping movement thereof, with the angularly extending portions being initially flexed to exert a certain pressure between the stop surface portions and to require development of the high unit pressure prior to the lateral wiping action.

Additional important features of the invention relate to the arrangement of the contact means in a manner such as to effect a balance of the lateral forces developed from the wiping actions. In one preferred embodiment, the contact means are in two parallel groups for coaction with pads along opposite sides of a rectangular package, and the wiping actions are all effected in the same directions relative to a central plane intermediate the two groups, either toward or away therefrom so as to balance. In another arrangement, alternate contact means operate in one direction and the remaining operate in the reverse direction.

Additional features relate to the mounting of the package on the base means. In particular, holding means are provided for engaging the package at points between the centrally mounted chip and the ends thereof in a manner such as to obtain uniform engagement between the conductive pads and the active portions of the contacts while also minimizing bending stresses on the flat package. In one embodiment, a slide plate is provided for holding the package on the base means, the plate being provided with dimples for engaging the package at the proper points. In another embodiment, screws are used for holding the package on the base means.

Additional features relate to the provision of polarizing means for insuring that the package is mounted in the proper position, such polarizing means also serving to prevent lateral displacement of the package during mounting.

Still further features relates to the construction of a base means and the mounting of the contact means therein.

This invention contemplates further objects, features and advantages which will become more fully apparent from the following detailed description taken in conjunction with the accompanying drawings which illustrate preferred embodiments and in which.

Figures 1, 2, 3, 4:
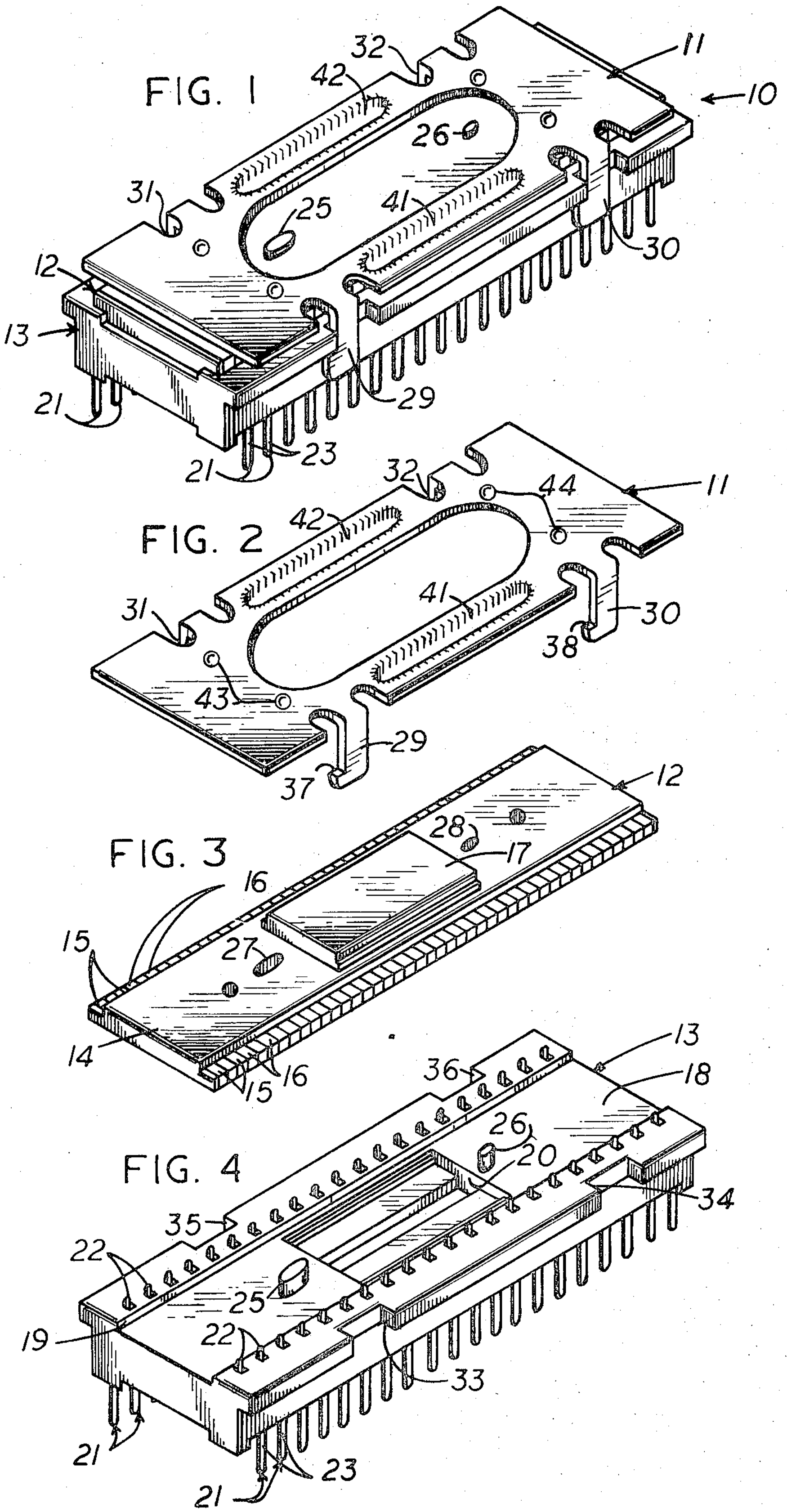
FIG. 1 is an isometric view showing an integrated circuit package mounted in an electrical connector device, according to the invention.
FIG. 2 is an isometric view of a slide plate of the assembly of FIG. 1.
FIG. 3 is an isometric view of the integrated circuit package shown in the assembly of FIG. 1, but in a reversed position.
FIG. 4 is an isometric view of a base and contact subassembly of the assembly of FIG. 1.

Reference numeral 10 generally designates an electrical connector assembly constructed in accordance with the principles of this invention, comprising a slide plate 11, an integrated circuit package 12 and a base and contact sub-assembly 13.

The integrated circuit package 12, shown in inverted position in FIG. 3, comprises an insulating body 14 of flat rectangular form with conductive pads 15 arranged in two groups along opposite sides of the body 14, there being insulating portions 16 between adjacent pads. Connections are provided between the pads 15 and an integrated circuit chip disposed centrally within a rearwardly projecting generally flat rectangular portion 17 of the body 14. The details of the internal construction of the package 12 are not shown but it will be understood that the package 12 may be fabricated in layers, applying to one layer a pattern of metal forming the conductive pads 15 and connections therefrom to the terminals of the chip, using fabrication procedures known in the semi-conductor art. In the illustrated package 12, the rearward surfaces of the pads 15 are at a level slightly above the rearward surface of an intermediate portion of the body 14 between the two groups of pads.

It is noted that, if desired, the conductive pads could be provided on both the top and bottom surfaces of the package, to permit use of the package in alternative positions or to provide for additional connections thereto. It is also noted that terms such as frontwardly, rearwardly, horizontal, vertical and the like are used herein for ease of description and clarity only and are not to be construed as limitations, since the positioning of the connector is not critical.

The base and contact sub-assembly 13 comprises a body 18 of insulating material having a longitudinally extending shell recess 19 in its upper surface for receiving the portion of the package body 14 between the two groups of pads 15 and having a central deeper recess 20 so formed as to receive the rearwardly projecting central portion 17 of the package body 14. The subassembly 13 further includes a plurality of contact means 21 including active portions 22 projecting frontwardly from the front surface of the body 18 and rearwardly projecting terminal portions 23 for connection to external circuitry. The contact means 21 are arranged in two parallel groups, with the active portions 22 being positioned for alignment in coaction with the conductive pads 15.

In assembly, the package 12, inverted from the position shown in FIG. 3, is disposed on the sub-assembly 13 in a predetermined position in which the rearward surfaces of the pads 15 engage the active portions 22 of the proper contact means 21 and in which upstanding posts 25 and 26 of the body 18 pass through openings 27 and 28 of the package body 14. The posts 25 and 26 and respective openings 27 and 28 have different sizes and/or configurations to perform a polarizing function.

After positioning the package 12, the slide plate 11 is disposed over the package 12 in a position such that two pairs of depending side legs 29–32 extend through slots 33–36 formed in the sides of the body 18. The slide plate 11 is then moved longitudinally, to the left in the illustrated arrangement, to position upwardly facing portions of the lugs 29–32 against rearward surface portions of the body 18, upwardly facing surface portions 37 and 38 of the lugs 29 and 30 being shown in FIG. 2. The slide plate 11 is formed with a central opening 40 to clear the posts 25 and 26 and to expose the central portion of the package, within which the chip is mounted, to circulation of air for cooling. In addition, the slide plate 11 is formed with rigidifying ribs 41 and 52 and two pairs of downwardly struck dimples 43 and 44 which engage the package body 14 at points intermediate the chip and the ends of the body 14, such that forces are more uniformly applied between the conductive pads 15 and the active portions 22 of the contact means 21, while stresses on the package 12 are minimized.

Figure 6:
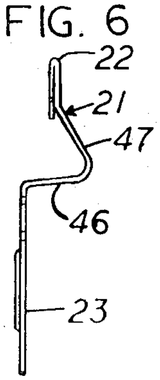
FIG. 6 is a side elevational view of one contact before installation in the assembly.

Very important features of the invention relate to the construction, mounting and operation of the contact means 21. One of the contact means 21 is shown in FIG. 6. The lower terminal portion 23 is integrally connected to a mounting portion 45, both being in a vertical plane, with the upper end of the mounting portion 45 being integrally connected to one end of a horizontally or laterally extending portion 46 the opposite end of which is secured to the lower end of a portion 47 extending angularly upwardly and toward the vertical plane of the portion 23. The active portion 22 is integrally connected to the upper end of the angularly extending portion 47 and extends nearly vertically. Preferably, the active portion 22 is formed by bending back the metal sharply on itself to form a rounded end having a radius approximately equal to the thickness of the metal. The contact means 21 may be of beryllium copper or of a similar resilient and highly conductive material and a gold plating may be applied at least on the upper end of the active portion 22 to lower the contact resistance. The thickness of the metal may be on the order of 0.006 inches while the width of the active portion 22 and portions 46 and 46 may be on the order of 0.018 inches. The terminal portion 23 may have a somewhat larger width somewhat on the order of 0.025 inches. The distance from the upper surface of the portion 46 to the upper end of the active portion 22 may be on the order of 0.15 inches while the other dimensions may be in approximately the same proportions as illustrated in the drawing. These dimensions are not excritical and are not to be construed as limitations, except that it is important to properly proportion the dimensions of the contact means in relation to the resiliency of the material, to obtain the operations described hereinafter.

The base 18 is formed with a plurality of bores 48, one for each of the contact means 21, each of which converges from a wider lower end to a narrowed upper end through which the active portion 22 projects. The contact means 21 are held in position in part by means of a back plate 50 of insulating material, having an upper surface 50*a* and having side edges which engage the inner surfaces of the mounting portions 45. Base 18 is provided with a series of notches 51 to receive the mounting portions 45 which are thus clamped in such notches 51 by the backing plate 50.

With reference to FIG. 6 A, it is noted that in forming the short radius rounded end s of the active portions 22, a portion 49 of the metal is bent back, portion 49 being widened at its rearward end to provide forwardly and outwardly facing convergent surface portions 49*a* and 49*b*. During assembly, the contacts are deformed to cause such surface portions 49*a* and 49*b* to be in pressure engagement with rearwardly and inwardly facing divergent surface portions 48*a and 48b* of the bore 48. Preferably each mounting portion 45 is formed with a pair of teeth 45*a* and 45*b* engaged in the sides of the slot 51 to hold the contacts in position.

In assembly, all of the contacts may be inserted into the base to interengage the surface portions 49*a*, 49*b* with surface portions 48*a*, 48*b* with mounting portions 45 being locked in the notches 51 by the teeth 45*a*, 45*b*. Then the backing plate 50 may be installed. To hold the backing plate 50 on the base 18, the base 18 is formed with a plurality of downwardly projecting posts 52, extending through openings in the backing plate 50, the lower ends of the posts being heated to form enlarged head portions after assembling. It is noted that the backing plate 50 and base 18 are formed with aligned central slots 53 and 54, below the recess 20, for conducting circulating air to the central portion of the package, containing the chip.

Figure 5:
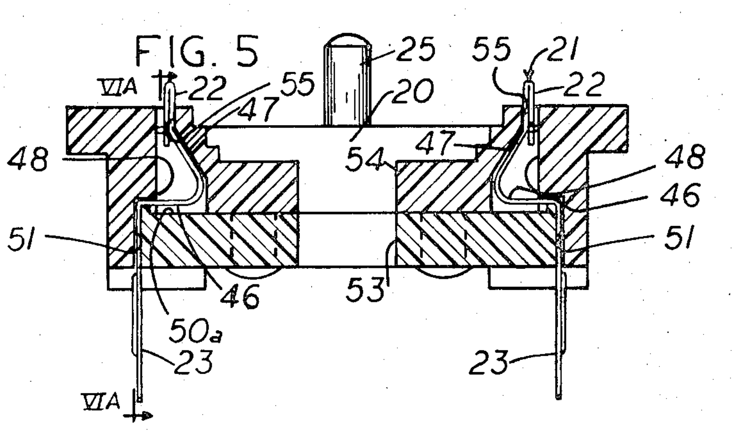
FIG. 5 is a sectional view taken substantially along line V—V of FIG. 4.

FIG. 5 shows the condition of the contact means 21 before assembly with the integrated circuit package. The active end portions 22 project a substantial distance above the upper surface of the base 18 and the lower parts of the active portions 22, as well as the upper end of the angularly extending portions 47, engage outwardly facing surface portions 55 at the narrowed upper ends of the slots 48. Preferably, the angularly extending portions 47 are bent to a certain degree during assembly to provide a certain pressure engagement with the surfaces 55.

Figure 7:
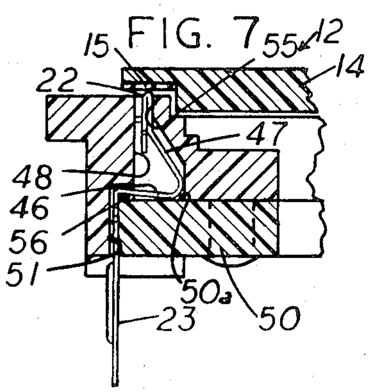
FIG. 7 is a view similar to a left-hand portion of the cross-sectional view of FIG. 5, but showing an integrated circuit package at an intermediate position during installation thereof.

FIG. 7 illustrates the condition of the contact means 21 after the package 14 is positioned and moved downwardly through a certain distance. During the initial portion of the downward movement of the pad 15, the active contact portion 22 is moved straight downwardly, being held against the surface 55 through the pre-loading of the angularly extending portion 47. During the initial part of movement, deformation of the contact means 21 takes place in the bending of the laterally extending portion 46, it being noted that the backing plate 50 is provided with an upstanding ridge engaging the portion 46 where it is connected to the upper end of the terminal portion 23. In the condition shown in FIG. 7, the portion 46 has been bent to an extent such that it engages stop means defined by the upper surface 50*a* of the backing plate 50 preventing further downward displacement. Thus, a high unit pressure is at this point developed between the active contact portion 22 and the conductive pad 15.

Figure 8:
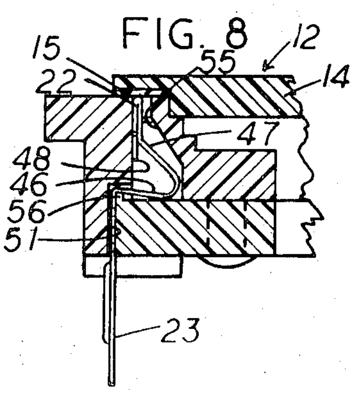
FIG. 8 is a view similar to FIG. 7 but showing the integrated circuit package in a final position.
Figure 6A:
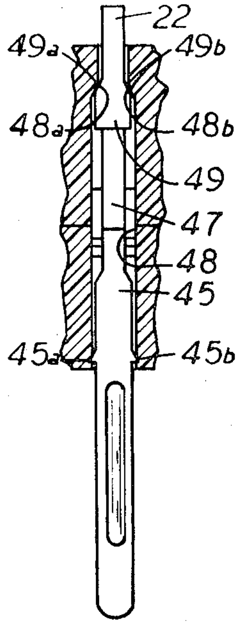
FIG. 6A is cross-sectional view on an enlarged scale taken substantially along VIA—VIA of FIG. 5.
Figure 9:
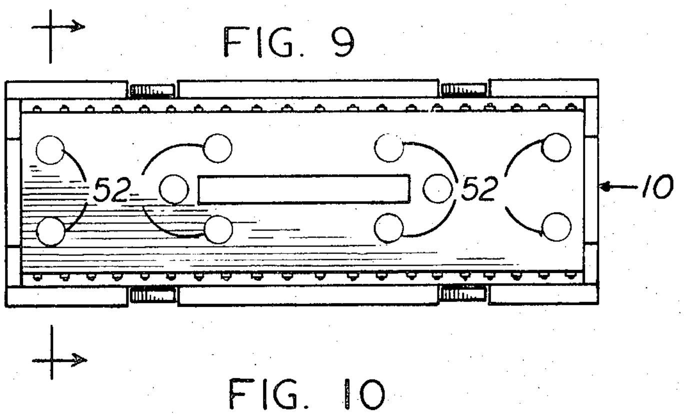
FIG. 9 is a bottom plan view of the assembly of FIG. 1.
Figure 10:
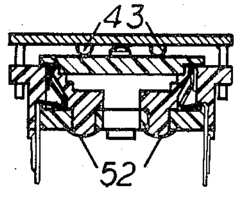
FIG. 10 is a cross-sectional view taken substantially along line X—X of FIG. 9.

With further downward movement of the pad 15, the active portion 22 is forced to move laterally through deformation of the angularly extending portion 47, finally reaching a position as shown in FIG. 8. During this movement a lateral wiping action takes place between the rounded upper end of the active portion 22 and the rearward surface of the pad 15 and because of the fact that the wiping action is performed under high unit pressure, an excellent electrical contact is obtained with very low resistance.

It is noted that the portion 47 normally extends at an acute angle relative to a vertical plane, preferably less than 45 degrees, which is of significant assistance in obtaining the wiping action under high unit contact pressure.

Figure 11:
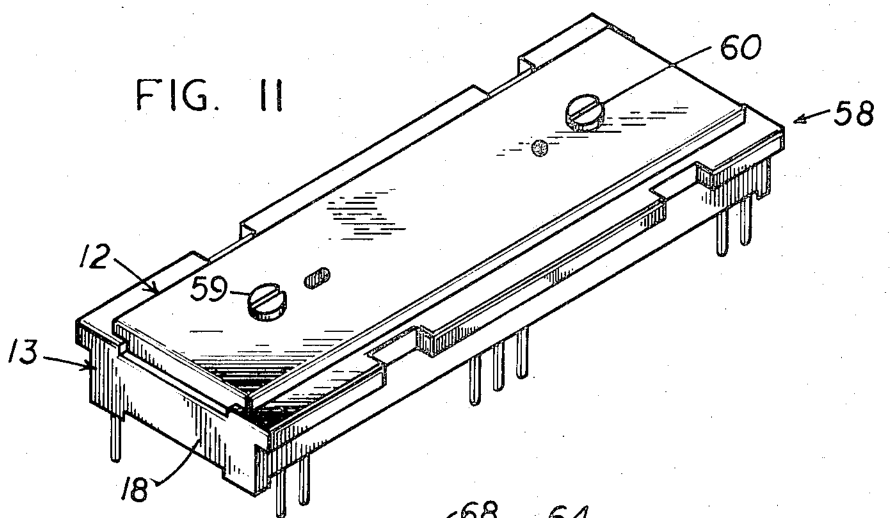
FIG. 11 is an isometric view showing a modified assembly according to the invention.

Referring to FIG. 11, reference numeral 58 generally designates a modified arrangement using the same base and contact sub-assembly 13 and the same integrated circuit package 12 but with screws 59 and 60 being substituted for the slide plate 11, the screws 59 and 60 having head portions engaged with the upper surface of the package 12 and having shank portions extending through the package 12 and threaded into the insulating base 18. It is noted that the screws 59 and 60 are located between the central portion of the package which contains the chip and the ends of the package, the location being such as to obtain a more uniform application of forces between the conductive pads and the active portions of the contacts.

Figure 12:
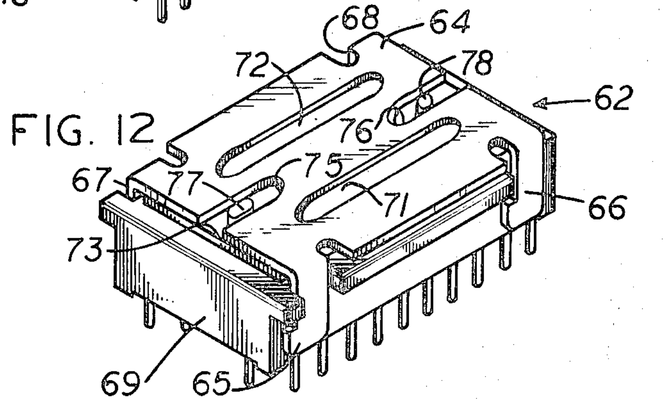
FIG. 12 is an isometric view of another modified assembly according to the invention.
Figure 13:
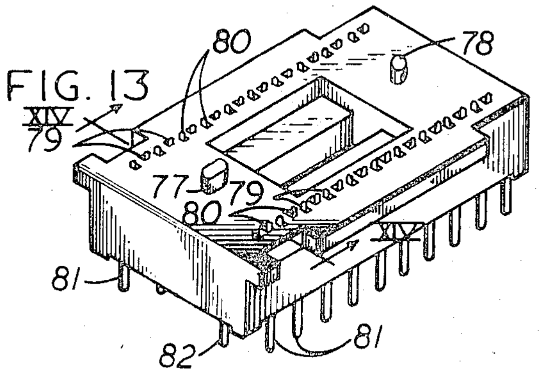
FIG. 13 is an isometric view of a base and contact sub-assembly of the assembly of FIG. 12.
Figure 14:
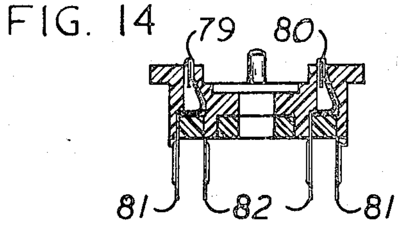
FIG. 14 is a cross-sectional view taken substantially along line XIV—XIV of FIG. 13.

Referring to FIGS. 12–14, reference numeral 62 generally designates another embodiment similar to the assembly 10 but having a modified slide plate and a modified arrangement of contact means. In this arrangement, a slide plate 64 is provided having lugs 65–68 similar to the lugs 29–32 and extendable through side slots in a base 69. The plate 64 has a pair of ribs 71 and 72 which rigidify the plate and also serve to press an integrated circuit package downwardly, the ribs 71 and 72 extending in the longitudinal direction and being located between a central vertical plane of the assembly and the sides of the assembly. Plate 64 is provided with slots 75 and 76 to clear posts 77 and 78, similar to the posts 25 and 26, which project upwardly from the base 69 through openings in the package 73.

As shown in FIGS. 13 and 14, contact means 79 and 80, similar to the contact means 21, are mounted in the base 69 in a manner similar to the mounting of contact means in the base 18, except that the orientation of the contact means 79 is opposite the orientation of the contact menas 80. The wiping movement of each of the contact means 79 is in a direction away from a central vertical plane of the assembly, whereas the wiping action of each of the contact means 80 is in a direction toward the central plane of the assembly. Preferably, as shown, the contact means 79 and 80 are arranged in a manner such that alternate ones of each side group operate in one direction while the remaining operate in the opposite direction.

It is noted that in the assembly 10, each of the contact means operates in a direction away from the central plane of the assembly so that there is a balancing of the wiping forces. However, the alternating arrangement of FIGS. 13 and 14 may be preferred, especially where the conductive pads may be disposed along only one side of the package. Another advantage is that the lower end terminal portions of the contact means 79 and 80, respectively designated by reference numerals 81 and 82 are laterally offset which may be an advantage in making connections to the terminal portions.

It will be understood that modifications and variations may be effected without departing from the spirit and scope of the novel concepts of this invention.

We claim as our invention:

1. An electrical connector device for a flat integrated circuit package having rearward surface means and a plurality of conductive pads having rearward surfaces lying substantially in a plane, said device providing connections for said plurality of conductive pads and comprising: insulating base means including front surface means and a plurality of bores extending from said front surface means rearwardly into said base means, a plurality of metallic contact means mounted in said bores and including active portions projecting frontwardly through said bores a certain distance beyond said front surface means, rearward movement of said package being operative to move said rearward surface means thereof in a direction toward said front surface means of said base means and to bring said rearward surfaces of said pads into engagement with said active portions of said contact means, each of said contact means including pressure-developing means operative in response to an initial portion of additional rearward movement of said pads to initially develop a high unit pressure engagement between said active portions and said pads, each of said contact means and its associated bore having cooperating lateral deflection control means operative after said initial portion of said additional rearward movement in response to a subsequent portion of said additional rearward movement to effect a lateral movement of said active portions and a wiping action on said pads under said high unit pressure, said pressure-developing means including resilient support means arranged for allowing rearward movement of said active portions through a substantial distance for gradual development of said high unit pressure prior to said lateral movement of said active portions under control of said lateral deflection control means.

2. In a device as defined in claim 1, said resilient support means comprising a generally laterally extending portion of spring metal.

3. In a device as defined in claim 2, rearward stop means for limiting rearward deflection of said laterally extending portion and to control initiation of said lateral movement of said active portions after said initial portion of said additional rearward movement.

4. In a device as defined in claim 1, said lateral deflection control means comprising a portion of spring metal extending angularly at an acute angle relative to a line parallel to the rearward direction of travel of said pads.

5. In a device as defined in claim 4, said acute angle being substantially less than 45°.

6. In a device as defined in claim 4, said lateral deflection control means including interengageable stop surface portions of said base and contact means for limiting lateral movement of said active portions in a direction opposite the lateral wiping movement of said active portions.

7. In a device as defined in claim 6, said pressure-developing means including a laterally extending portion of spring metal having first and second opposite ends, said lateral deflection control means comprising said portion of spring metal integrally connected at one end to said first end of said laterally extending portion and extending angularly laterally and frontwardly to an opposite forward end, said active portion being integrally connected to said opposite forward end and projecting forwardly to a terminal engageable with a conductive pad, and a terminal portion integrally connected to and extending rearwardly from said second end of said laterally extending portion.

8. In a device as defined in claim 7, said base means including first stop means engagable by said first end of said laterally extending portion after rearward movement of said active portion through a substantial distance, and second stop means engaged by said opposite end of said angularly extending portion to limit deflection of said active portion in a direction opposite the lateral wiping movement of said active portion.

9. An electrical connector as defined in claim 1, wherein the integrated circuit package is generally rectangular and the pads are arranged in at least one group in spaced relation along a line parallel to a central plane, said contact means being positioned for alignment and coaction with said pads, said lateral wiping movement of said active portion of each contact means being in a direction transverse to said central plane.

10. In an electrical connector as defined in claim 9, wherein said lateral wiping movement of said active portion of each contact means produces a change in a certain direction relative to said plane, said contact means being so arranged that said change is in one direction for approximately half the contact means and in the opposite direction for the remainder of the contact means.

11. In a device as defined in claim 10, said movement being in one direction for alternate ones of said contact means of said group and in the opposite direction for the remainder of said contact means of said group.

12. In a device as defined in claim 10, wherein the pads of the integrated circuit package are disposed in two groups along opposite sides of the package, said contact means being arranged in corresponding groups for alignment and coaction with said two groups of pads, lateral movement of said active portions of all contact means being effective to produce a change of distance in the same direction relative to a central plane intermediate said two groups of contact means.

13. A metallic contact means for engagement by a conductive pad or the like movable rectilinearly in a certain direction, and arranged to be positioned in a connector device with insulating base means and at least one bore, said contact means comprising: an active portion engageable by the pad when the pad is moved in said direction, resilient support means arranged for allowing rearward movement of said active portion through a substantial distance to initially develop a high unit pressure engagement between said active portion and said pad prior to lateral movement of said active portion, and lateral deflection control means arranged for cooperating with said bore and operative in response to at least a portion of additional movement of said active portion in said direction to effect a lateral movement of said active portion and a wiping action on said pad under high unit pressure, said lateral deflection control means comprising a portion of spring metal supported at one end thereof and extending laterally and toward the pad at a certain angle to an opposite forward end, said certain angle being an acute angle of substantially less than 45° relative to a line parallel to said direction.

14. In a contact means as defined in claim 13, said active portion being integrally connected to and extending from said opposite end of said laterally extending portion toward said pad.

15. An electrical connector device for a flat integrated circuit package having rearward surface means and a plurality of conductive pads having rearward surfaces lying substantially in a plane, said device providing connections for said plurality of conductive pads and comprising: insulating base means including front surface means and a plurality of bores extending from said front surface means rearwardly into said base means, a plurality of metallic contact means mounted in said bores and including active portions projecting frontwardly through said bores a certain distance beyond said front surface means, rearward movement of said package being operative to move said rearward surface means thereof in a direction toward said front surface means of said base means and to bring said rearward surfaces of said pads into engagement with said active portions of said contact means, each of said contact means including pressure-developing means operative in response to an initial portion of additional rearward movement of said pads to initially develop a high unit pressure engagement between said active portions and said pads, each of said contact means and its associated bore having cooperating lateral deflection control means operative after said initial portion of said additional rearward movement in response to a subsequent portion of said additional rearward movement to effect a lateral movement of said active portions and a wiping action on said pads under said high unit pressure, said base means including first stop means engageable by said pressure-developing means after said initial portion of said additional rearward movement, and second stop means engageable by said contact means to limit lateral deflection of said active portion in a direction opposite the lateral wiping movement of said active portion.

16. In a device as defined in claim 1, holding means engageable with portions of said package for holding said package and said pads against said active portions.

17. In a device as defined in claim 16, said holding means comprising a plate and projection means on the underside of said plate engageable with said portions of said package.

18. In a device as defined in claim 16, said holding means comprising a pair of screws having head portions engaging said portions and shank portions extending through said package and threaded into said base means.

19. In a device as defined in claim 15, said pressure-developing means including resilient support means.

20. In a device as defined in claim 19, said lateral deflection control means comprising a portion of spring metal extending angularly at an acute angle relative to a line parallel to the rearward direction of movement of said pads.

* * * * *

UNITED STATES PATENT OFFICE

CERTIFICATE OF CORRECTION

PATENT NO. : 3,831,131

DATED : August 20, 1974

INVENTOR(S) : Brian R. Woodcock & John L. Tansky

It is certified that error appears in the above-identified patent and that said Letters Patent are hereby corrected as shown below:

Column 4, line 51, change "52" to -42-.

Column 5, line 1, change "23" to -22-; line 13, change "46" (second occurrence) to -47-.

Column 6, line 8, change "14" to -12-.

Column 7, line 8, change "menas" to -means-.

Column 8, line 62, change "of" to -for-; same line, after "group" insert -of pads-; line 63, change "of" (second occurrence) to -for-.

Signed and Sealed this

*sixteenth* Day of *March 1976*

[SEAL]

*Attest:*

RUTH C. MASON
*Attesting Officer*

C. MARSHALL DANN
*Commissioner of Patents and Trademarks*